Figure 1:
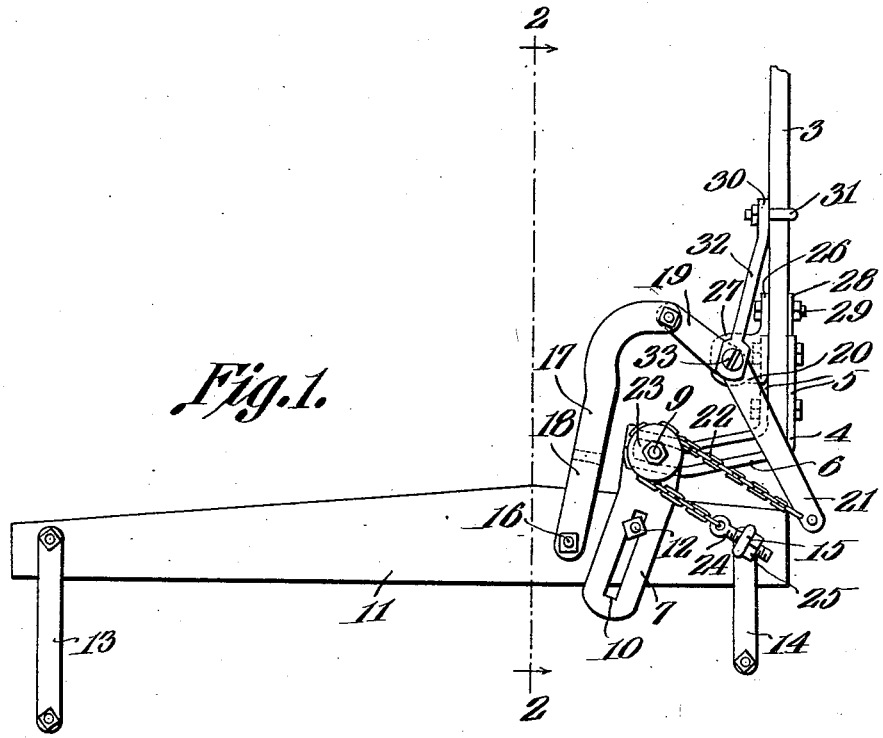

V. J. TICHOTA.
DRAFT EQUALIZER.
APPLICATION FILED NOV. 30, 1912.

1,076,331.

Patented Oct. 21, 1913.

Witnesses

Vencel J. Tichota,
Inventor by C. A. Snow & Co.
Attorneys

UNITED STATES PATENT OFFICE.

VENCEL J. TICHOTA, OF DODGE, NEBRASKA.

DRAFT-EQUALIZER.

1,076,331. Specification of Letters Patent. Patented Oct. 21, 1913.

Application filed November 30, 1912. Serial No. 734,423.

*To all whom it may concern:*

Be it known that I, VENCEL J. TICHOTA, a citizen of the United States, residing at Dodge, in the county of Dodge and State of Nebraska, have invented a new and useful Draft-Equalizer, of which the following is a specification.

The present invention appertains to draft equalizers, and aims to provide a novel and improved device of that character which shall be readily applicable to plow beams, or other parts of the riding or walking earth tilling implements or the like:

It is also the object of the present invention to provide a device of the character indicated which shall be so constructed and operated as to distribute the draft proportionately between the horses or draft animals in an effective manner, and in order that the draft animals may walk abreast, and in addition, to prevent any unnecessary side draft.

Another object of the present invention is to provide a draft equalizer for the attachment of two sets of draft animals, and which shall be operable to produce a resultant draft extending approximately in the line of draft of the plow, or the like, the device being so operable that any unevenness or inequality of draft produced by the various draft animals will not cause the resultant draft to deviate appreciably from the normal line of draft, so as not to produce any undesirable or under side draft.

A still further object of this invention is to provide a device of the character indicated embodying a lever having long and short arms to which the respective sets of draft animals are attachable, in connection with novel means for operatively connecting the lever with the plow beam, or the like, so that the resultant draft created by the animals will be approximated in alinement with the line of draft of the plow, notwithstanding the diversity of movements of the draft animals within practical limits.

The present invention also contemplates the provision of a draft equalizer which shall be compact, substantial, durable, inexpensive and simple in construction; and which in use will be of increased efficiency, serviceability and convenience.

The present invention aims to provide a floating evener bar, and operable means for connecting the same to the beam of a plow, or other object, for permitting the evener bar to swing freely and to shift forwardly and rearwardly, as it is swung, in order to effectively equalize the draft between the arms or ends of the evener bar, and in order to permit a yielding action between the evener bar and the plow beam or other object, without a loss of draft, or a variance in the transmission of the draft to the plow beam.

The invention also contemplates the provision of a floating evener bar, and means for guiding the same for shifting and swinging movements and for permitting the plow, or other object, to be readily turned or steered, when the draft animals are turned to either side.

To the above and other ends, which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

The preferred embodiment of the invention has been illustrated in the accompanying drawing, wherein:—

Figure 2:
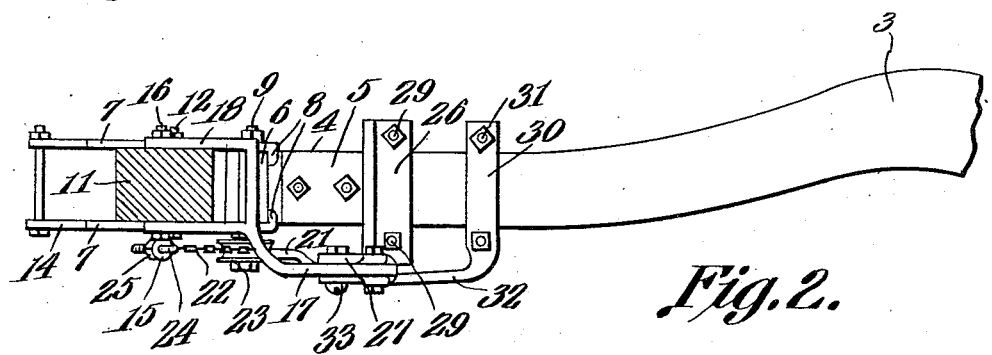

Figure 1 is a bottom plan view of the draft equalizer as applied to a plow beam. Fig. 2 is a sectional view taken on the line 2—2 of Fig. 1.

Referring specifically to the drawings, the plow beam has been designated by the numeral 3 and is of usual construction. The part designated by the numeral 3 may represent any other part of a riding or walking soil tilling implement or the like, according to the use to which the device is put.

In carrying out the invention, a bar 4 has been secured to the forward end of the beam, the said bar being doubled and the ends 5 being bolted or otherwise secured to the sides or vertical faces of the beam. The intermediate portion or bend of the bar 4 has been bent angularly, or at approximate right angles, to the beam as designated by the numeral 6, to provide an arm projecting to one side.

Upper and lower guide plates 7 are seated or bear against the upper and lower edges of the bar 4 adjacent the bend of the bar and are provided with lips 8 at their rear ends overlapping the bar, the said plates projecting forwardly at an acute angle relative to the beam 3. A bolt 9 is passed through the guide plates 7 and through or between the sections of the bar 4 so as to clamp the guide plates in position, the lips 8 overlapping the bar preventing the guide plates from being swung out of position, after the guide plates have once been set in position. Each of the guide plates 7 is provided with a longitudinal slot 10.

The evener or equalizing bar has been designated by the numeral 11, the same passing between the guide plates 7 and having a bolt, pin or other member 12 passed therethrough adjacent its fulcrum, or between its fulcrum and the end of the beam 3. The ends of the bolt 12 pass through the slots 10 of the guide plates, so that the evener bar is guided to move longitudinally or approximately so. A pair of links 13 are connected to the outer or far end of the evener bar or to the end of the long arm thereof, while a pair of links 14 are connected to the inner or near end of the evener bar, or to the end of the short arm. The respective links 13 and 14, which may be in the form of clevises if desired, are adapted for the connection of suitable whiffletrees, double trees, swingle trees, or the like, according to the number of draft animals employed or according to other circumstances. The links 14 are pivoted to the end of the short arm of the evener bar by means of an eye-bolt 15 passing through the evener bar, the eye of which is arranged at the lower end or below the evener bar.

A bolt 16 is passed through the fulcrum of the evener bar and a link 17 is pivoted to the said bolt, the link having a fork 18 at its forward end straddling the evener bar and pivoted to the ends of the bolt 16. The rear end of the link 17 is pivoted to the short arm 19 of a lever 20 fulcrumed to the beam, the lever 20 standing diagonally or obliquely relative to the beam 3 with its long arm projecting forwardly, as designated by the numeral 21. A chain or other flexible member 22 is connected to the end of the long arm 21 of the lever and is trained around a pulley or sheave 23 journaled on the lower end of the bolt 9, the other end of the chain 22 being connected to the end of the short arm of the evener bar. The end of the chain is adjustably connected to the evener bar by means of an eye bolt 24 connected to the end of the chain and having its tail passing through the eye of the eye bolt 15 and bearing a nut 25. Thus, by adjusting the nut 25, the chain 22 may be adjusted in order to properly set the normal positions of the lever, link and evener bar, as will be understood.

As a means for fulcruming the lever 20 to the plow beam 3, there has been provided the structure presently described. A short length or piece of angle iron 26 has one flange thereof abutting against the side or vertical face of the plow beam, and the lower end of the other or free flange is bent angularly to provide an ear 27. A bar 28 contacts with the other face or side of the beam opposite the angle iron 26 and the bolts 29 connect the bar 28 and the angle iron 26 so as to clamp both parts in position over the beam. An upright bar 30 is also clamped to one side or face of the plow beam in rear of the angle iron 26 by means of a U-bolt or clip 31, the lower end of the bar 30 being fashioned into a forwardly projecting arm 32 terminating at its forward end below the ear 27. The intermediate portion of the lever 20 passes between the end of the arm 32 and the ear 27 and is fulcrumed to the said parts by means of a bolt or other pivot member 33.

In use, the draft animals, of which there may be any convenient number, are hitched to the respective ends or arms of the evener bar by means of suitable appliances, such as whiffletrees, doubletrees, swingletrees or the like. The bolt 12 carried by the evener bar being guided for longitudinal movements in the slots 10 will cause the entire draft to be transmitted to the short arm 19 of the lever 20 through the medium of the link 17, thus tending to swing the short arm of the lever forwardly. This swinging tendency of the lever 20 will pull the chain 22 with the long arm 21 of the lever, so as to tend to draw the short arm of the evener bar rearwardly, and conversely, the extensive draft on the short arm of the evener bar will tend to pull the fulcrum of the evener bar rearwardly. As the evener bar swings or oscillates due to the uneven drafts applied to the respective ends thereof the bolt or member 12 carried by the evener bar will reciprocate in the slots 10 of the guides. The draft necessary to propel or move the plow, vehicle or the like to which the draft equalizer is attached will thus be distributed between the two sets of draft animals in the most effective and desirable manner and in order to eliminate any excessive or unnecessary side draft.

In a device of the present character, it is desirable that the arm of the evener bar should extend to points relatively close and remote, respectively, to and from the line of draft of the plow, or the line of the furrow being plowed, in order that the two sets of draft animals will properly travel over the soil, but with the provision of the uneven or unequal lengths of the arms, it will be noted that the draft transmitted to the long arm will tend to create a side draft or twisting tendency. Thus, when the long arm of the evener bar is given a proportionately greater strain or draft, there will be a tendency to pull the long arm of the evener bar forwardly, and when this takes place, the link 17 will be drawn forwardly so as to swing the lever 20, and as a consequence, the chain 22 will be drawn taut and will tend to transmit a portion of the draft to the short arm, so as to counteract the twisting tendency. This action of the device also serves to maintain the resultant draft line approximately in alinement with the draft line of the plow under the varying conditions.

Supposing that a team of horses or draft animals are hitched to the short arm of the evener bar, and that a single horse or draft animal is hitched to the long arm of the evener bar, it will be evident that the aggregate draft created by the draft animals will be transmitted to the plow beam 3 through the medium of the two members 33 and 9. The evener bar is not fulcrumed directly to the plow, but acts in the manner of a floating lever, the draft being transmitted to the lever 20 and pulley 23 through the medium of the link 17 and chain 22. Should the draft created by the single animal become proportionately greater than that created by the animals connected to the short arm of the evener bar, it will be noted that the evener bar will be swung in a novel manner, so that a greater strain will be thrown upon the draft animals connected to the short arm of the evener bar. Thus, through the medium of the link 17, lever 20 and chain 22, and pulley 23, the draft will be proportioned in a most efficient manner between the respective draft animals attached to the two arms of the evener bar. The parts 17, 20, 22 and 23 are not only desirable for effectively distributing the draft properly, between the two sets of draft animals, but it will also be observed that they provide a compact and simple arrangement for equalizing the draft between the two sets of draft animals, and for maintaining the resultant line of draft in an approximately predetermined position under the varying conditions. Another feature provided by the present device, is the fact that ordinarily, there will be no tendency for turning or steering the beam 3, but when the draft animals are turned to one side or the other, the evener bar will be similarly drawn, so that the bolt 12 in working within the slots 10 will engage the respective edges of the said slots so as to swing the forward end of the plow beam in the proper direction. Ordinarily, the bolt 12 is free to vibrate in the slots 10 without effect, this being desirable, however, in order to prevent the evener bar from being displaced as might result if the same were merely attached to the link 17 and the chain 22.

From the foregoing, taken in connection with the drawing, the advantages and capabilities of the present device will be apparent to those versed in the art, and it will be noted that the objects aimed at have been carried out satisfactorily, the present device providing a desirable appliance for the purposes for which it is designed.

Having thus described the invention what is claimed as new is:—

1. In combination with a supporting structure including a guide, an evener bar guided at a point adjacent its fulcrum by the guide, a rocking member carried by the supporting structure, a member connecting the rocking member and the fulcrum of the evener bar, a sheave journaled to the structure, and a flexible member attached to the rocking member, trained over the sheave, and connected to the end of the evener bar adjoining the structure.

2. In combination with a supporting structure, a forwardly projecting guide secured thereto, an evener bar guided at a point adjacent its fulcrum by the guide, a sheave journaled at the rear end of the guide, a lever fulcrumed to the structure, a link connecting one arm of the lever and the fulcrum of the evener bar, and a flexible member attached to the other arm of the lever, trained over the sheave and connected to the end of the evener bar adjoining the structure.

3. In combination with a plow beam, an arm secured to and projecting angularly from the forward end thereof, a forwardly projecting guide secured to the said arm, an evener bar guided at a point adjacent its fulcrum by the said guide, a sheave journaled at the rear end of the guide, a lever fulcrumed to the beam, a link connecting the fulcrum of the evener bar and one arm of the lever, and a flexible member connected to the other arm of the lever, trained around the sheave and attached to the end of the evener bar adjoining the beam.

4. In combination with a plow beam, an arm secured to and projecting angularly from the forward end of the beam, guide plates secured to the arm and projecting forwardly therefrom, the guide plates having longitudinal slots therein, an evener bar passing between the guide plates, a member carried by the evener bar at a point between its fulcrum and the beam and working through the said slots, a sheave journaled at the rear end of the guide plates, a lever fulcrumed to the beam, a link connecting the fulcrum of the evener bar and one arm of the lever, and a flexible member connected to the other arm of the lever, trained around the sheave and attached to the end of the evener bar adjoining the beam.

5. In combination with a plow beam, a doubled bar having its ends secured to the sides of the forward end of the beam and having its intermediate portion bent angularly to one side, upper and lower guide plates bearing against the edges of the bar and having lips at their rear ends overlapping the bar, a bolt passing through the guide plates and the bar, the guide plates projecting forwardly and having longitudinal slots therein, an evener bar passing between the guide plates, a member carried by the evener bar at a point between its fulcrum and the beam and working through the said slots, a sheave journaled on one end of the said bolt, a lever fulcrumed to the beam, a link connecting the fulcrum of the evener bar and one arm of the lever, and a flexible member connected to the other arm of the lever, trained around the sheave and adjustably attached to the end of the evener bar adjoining the beam.

6. In a draft equalizer, a supporting structure, an evener bar guided at a point adjacent its fulcrum thereby, a rocking member carried by the structure, a member connecting the rocking member and the fulcrum of the evener bar, and a flexible member connecting the rocking member and the respective arm of the evener bar and guided by the said structure.

In testimony that I claim the foregoing as my own, I have hereto affixed my signature in the presence of two witnesses.

VENCEL J. TICHOTA.

Witnesses:
WILL R. HRABAK,
R. H. HOLSTEN.

Copies of this patent may be obtained for five cents each, by addressing the "Commissioner of Patents, Washington, D. C."